(No Model.)   2 Sheets—Sheet 1.

A. LINDGREN.
LISTER PLOW.

No. 364,829.   Patented June 14, 1887.

Attest.
Sidney P. Hollingsworth
Wm R Kennedy

Inventor
August Lindgren
By his Atty
P. T. Dodge (No Model.) 2 Sheets—Sheet 2.

A. LINDGREN.
LISTER PLOW.

No. 364,829. Patented June 14, 1887.

on line x—x

Attest.
Sidney P. Hollingsworth
Wm. R. Kennedy

Inventor.
August Lindgren
By his Atty
B. T. Dodge

N. PETERS, Photo-Lithographer, Washington, D. C.

UNITED STATES PATENT OFFICE.

AUGUST LINDGREN, OF MOLINE, ILLINOIS, ASSIGNOR TO THE MOLINE PLOW COMPANY, OF SAME PLACE.

LISTER-PLOW.

SPECIFICATION forming part of Letters Patent No. 364,829, dated June 14, 1887.

Application filed March 15, 1886. Serial No. 195,224. (No model.)

*To all whom it may concern:*

Be it known that I, AUGUST LINDGREN, of Moline, in the county of Rock Island and State of Illinois, have invented certain Improvements in Lister-Plows, of which the following is a specification.

This invention relates to that class of walking-planters commonly known as "listerplows," which consist, essentially, of a double mold-board to open a wide furrow, a secondary share or subsoiler to loosen the earth in the middle of the main furrow, and mechanism for automatically dropping the seed into the soil thus loosened.

The invention consists in the construction and arrangement of various parts, as hereinafter recited and claimed in detail, but more particularly to the peculiar manner of connecting the subsoiling and seed-planting devices with the main plow, that they may be adjusted vertically with reference thereto, and to the arrangement and connection of a covering-wheel by which motion is imparted to the seed-dropping mechanism.

Figure 1:
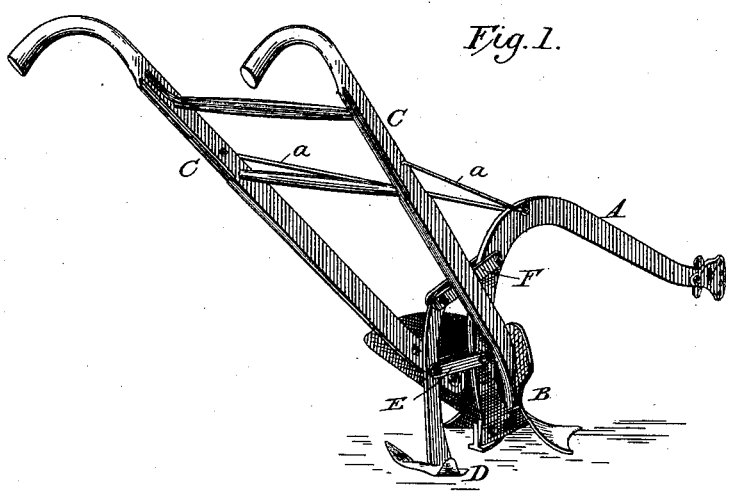
Figure 2:
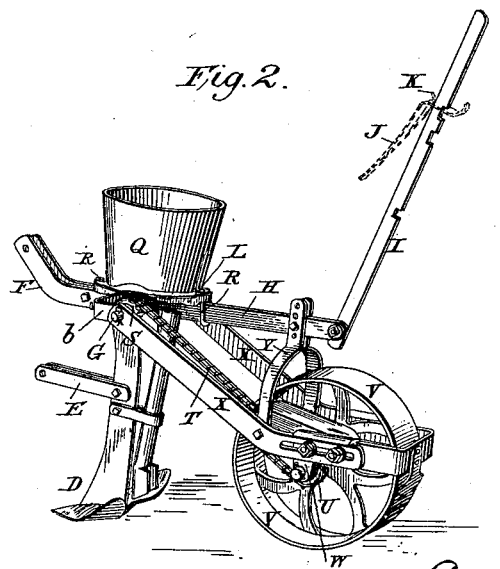
Figure 3:
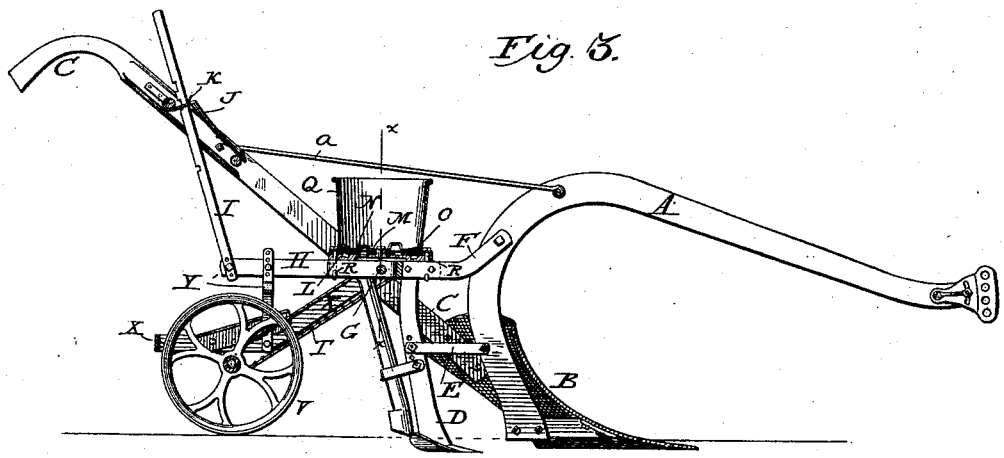
Figure 4:
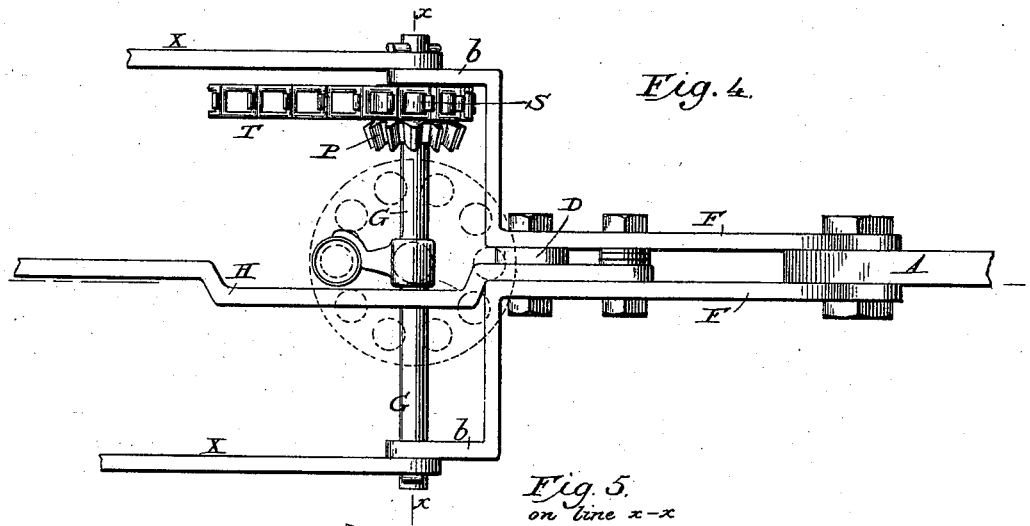
Figure 5:
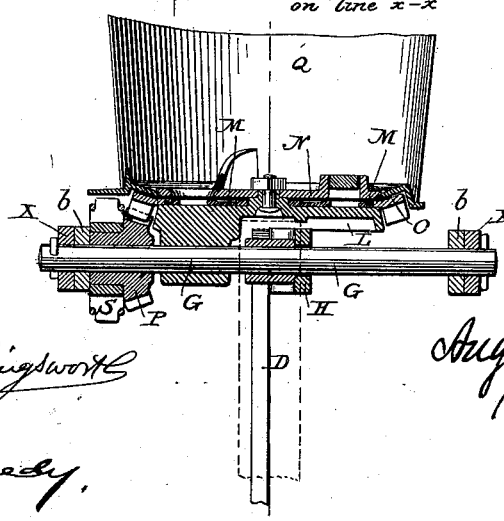

In the accompanying drawings, Figure 1 is a view of the plow proper, including the subsoiling device, the seeding device being detached. Fig. 2 is a perspective view of the seeding attachment as seen from the opposite side. Fig. 3 is a longitudinal vertical section through the implement as a whole. Fig. 4 is a top plan view of the seeder-frame secured to the beam. Fig. 5 is a vertical cross section on the line *x x* of the preceding figure.

Referring to the drawings, A represents a metal beam having its rear end curved downward to receive the double mold-board B—that is to say, a board adapted to throw the earth to both the right and the left. This mold-board is secured immovably to the lower end of the beam, as shown in the drawings, or in any other appropriate manner.

C C represent two diverging handles of ordinary form, secured at their forward ends to the inside of the mold-board and sustained by braces *a*.

The foregoing parts constitute jointly a double mold-board plow of practically the same construction as those now in common use.

In applying the improvement there is first provided a subsoiling tooth or share, D, having an upright standard. This standard is placed in rear of the beam and connected thereto, so that it may be adjusted vertically, by means of links E and arms F, pivoted at their two ends to the beam and the standard, respectively. There are two of the arms F, applied to opposite sides of the beam, their ends being bent outward in opposite directions and continued backward at their extremities, as shown at *b*, to sustain opposite ends of the feed-operating shaft G, as shown in Fig. 4. Between the lower ends of the arms F is inserted the forward end of a bar, H, the three parts being bolted rigidly together and the arms extended rearward, as shown, to receive an upright bar, I, by means of which the arms may be raised and lowered, so as to adjust the subsoiler D vertically with reference to the main plow. The bar I is provided with a series of notches in its rear edge to engage a locking-tooth on a cross-bar connecting the two handles. That the bar may remain in engagement with this tooth it is passed through a slot in a metal plate, J, provided with a spring, K, which acts against the notched bar, as shown in Fig. 3.

Upon the arms F and bar H is mounted a seed-distributing mechanism, such as shown in Figs. 2, 3, 4, and 5, consisting of stationary base-plate, L, overlying the rotary plate M, provided with a series of seed cells and a stationary cut-off plate, N, lying above the rotary plate, the construction and arrangement of these parts being essentially the same as in ordinary seed-planting machines, so that as the plate M is rotated its cells will be brought in succession beneath the opening in the plate N and filled with seed, and then brought in succession over an opening in the bottom plate, L, so as to deliver the charges of seed in succession into the conducting-tube thereunder. Motion is communicated to the rotary plate by an encircling ring, O, bearing at its inner edge upon the base-plate, L, and provided on its under edge with a series of spur-teeth, which engage a driving pinion, P, on the beforementioned shaft G. The plate M is notched at the periphery, to engage teeth on the driving-ring, and is held down to its place by the cut-off plate M, which is in turn secured by the central bolt. On releasing this bolt the plate M may be lifted out of place and the feed-plate removed, in order that another having cells of different size may be substituted. The outer edge of the base-plate is flanged, to receive the lower edge of a sheet-metal hopper, Q, which is held down in place by means of bolts R, passing through lips on its lower edge and engaging, respectively, beneath the arms F and bar H. Motion is imparted to the shaft G by means of a sprocket-wheel, S, secured to its end, and driven by a chain, T, from a sprocket-wheel, U, secured to the shaft of the ground wheel or roller V, which is made with a wide face and arranged to travel in the furrow directly in rear of the subsoil device. The wheel V has the ends of its axle carried in plates W, secured adjustably to arms X, which are journaled to the outer ends of the feed-shaft G, so that the wheel revolves around the shaft as a center without affecting the tension of the chain. The wheel-carrying arms X are sustained by arms Y, extending upward therefrom and bolted adjustably to the bar H. The arms Y are provided with a series of holes, through which fastening-bolts are passed into the bar H. This connection allows the wheel to be adjusted vertically in relation to the other parts, so that the earth will be opened to a greater or less depth, as demanded. The plates W are slotted horizontally, and secured to the arms X by bolts, so that the wheel may be adjusted forward and backward to regulate the tension of the driving-chain.

From the foregoing description it will be understood that the movement of the bar I serves not only to raise and lower the wheel, but also to raise and lower the subsoiling-share B. When the wheel is depressed and the bar I in engagement, the handles are held in an elevated position and the points of the mold-board and subsoiler depressed, so that they will properly enter the soil as the plow advances. If, however, the bar I be unlocked and the handles depressed, the points of the mold-board and subsoiler will be thrown upward and caused to ride out of the ground. It will be understood that the entire seeding mechanism swings about the forward pivots of the arms F as a center.

It will be observed that the arms F and the bar H bolted thereto constitute jointly a rigid frame for the support of the subsoiling and feeding devices and the covering-wheel. While it is preferred to construct this frame in the peculiar manner shown, it will be manifest to the skilled mechanic that it may be modified in its details, provided only it is adapted to give support to the parts above enumerated.

When the implement is in operation, the mold-board B opens a wide furrow. The share D, following after it, opens a secondary furrow or loosens the soil in the bottom of the main furrow. The wheel U, transmitting motion through the intermediate chain and other intermediate parts, causes a constant rotation of the bottom plate, L, by which the seed is delivered at intervals through the conducting-tube into the furrow immediately behind the share D. The wheel V, following immediately after, causes the soil to cover the seed and compact it suitably thereon.

Having thus described the invention, what is claimed is—

1. In a lister-plow, the combination, substantially as described, of the double mold-board plow, the rear frame closely united thereto by a horizontal pivot, the subsoiling device D, pivoted at its upper end to said frame, and a link, E, connected by pivots to the beam and the subsoiling device, respectively, whereby the subsoiling device may be raised and lowered without causing material change in its inclination.

2. In combination with a double mold-board plow, the rear frame hinged thereto to rise and fall, a subsoiling device and seeding devices connected to said frame, and the bar I, constructed and arranged, substantially as described, to lock the pivoted frame positively and rigidly in a depressed position, whereby the wheel is rendered available for regulating the depth of the furrow and for assisting in the transportation and manipulation of the plow.

3. In combination with the double mold-board plow, the frame hinged thereto to rise and fall, the devices for locking said frame in position, the subsoiling and seeding devices connected with said frame, the arms X, pivoted to said frame, the covering wheel or roller V, carried in said arms, and adjusting devices Y, for changing the height of the wheel with respect to the subsoil device.

4. The frame for the seeding attachment of a lister-plow, consisting of the two bars F, having their rear ends bent outward, as described, and the bar H, said parts firmly united, substantially as described and shown.

5. In a lister-plow, the combination of a double mold-board plow, the arms F, jointed to its beam and bent outward at their rear ends, a seed-delivering mechanism mounted upon said arms, and the operating-shaft G for the seed mechanism, sustained in the rear ends of the two arms, as described and shown.

6. In combination with the main plow, the arms F, pivoted thereto and bent outward at their rear ends, the feed-driving shaft G, mounted in said arms, a seed-dropping mechanism mounted thereon, arms X, journaled on the ends of said shaft, a ground-wheel carried by the arms X, and devices, substantially as shown, connecting said wheel with the shaft.

In testimony whereof I hereunto set my hand this 21st day of January, 1886, in the presence of two attesting witnesses.

AUGUST LINDGREN.

Witnesses:
L. C. ARP,
O. P. SOWERS.